(12) United States Patent
Noda et al.

(10) Patent No.: US 11,695,130 B2
(45) Date of Patent: Jul. 4, 2023

(54) FUEL CELL SYSTEM AND FUEL CELL SYSTEM CONTROL METHOD

(71) Applicant: NISSAN MOTOR CO., LTD., Yokohama (JP)

(72) Inventors: Tetsushi Noda, Kanagawa (JP); Tatsuya Yaguchi, Kanagawa (JP); Hayato Chikugo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 481 days.

(21) Appl. No.: 16/648,052

(22) PCT Filed: Sep. 29, 2017

(86) PCT No.: PCT/JP2017/035636
§ 371 (c)(1),
(2) Date: Mar. 17, 2020

(87) PCT Pub. No.: WO2019/064539
PCT Pub. Date: Apr. 4, 2019

(65) Prior Publication Data
US 2020/0266460 A1    Aug. 20, 2020

(51) Int. Cl.
*H01M 8/04014* (2016.01)
*H01M 8/04225* (2016.01)
(Continued)

(52) U.S. Cl.
CPC ... *H01M 8/04022* (2013.01); *H01M 8/04201* (2013.01); *H01M 8/04225* (2016.02);
(Continued)

(58) Field of Classification Search
CPC ......... H01M 8/04022; H01M 8/04201; H01M 8/04225; H01M 8/04302; H01M 8/04708;
(Continued)

(56) References Cited

U.S. PATENT DOCUMENTS

2009/0258260 A1    10/2009    Naganuma
2014/0038071 A1*   2/2014     Ogawa ............. H01M 8/04753
                                                        429/425
(Continued)

FOREIGN PATENT DOCUMENTS

JP    2007-305390 A    11/2007
JP    2013-89497 A      5/2013
(Continued)

*Primary Examiner* — Matthew W Van Oudenaren
(74) *Attorney, Agent, or Firm* — Foley & Lardner LLP

(57) ABSTRACT

A fuel cell system is provided and the fuel cell system includes: a fuel cell; a fuel processing unit configured to process a raw fuel to produce a fuel gas for the fuel cell; an oxidant gas heating unit configured to heat an oxidant gas for the fuel cell; a combustor configured to combust the raw fuel to produce a combustion gas for use in heating the fuel processing unit and the oxidant gas heating unit; a supply control unit configured to, during a warm-up of the fuel cell, control supply of the raw fuel to the fuel processing unit and the combustor; and a power generation control unit configured to control a power generation state during the warm-up of the fuel cell. When the fuel cell has reached a power generation available temperature, the power generation control unit is configured to cause the fuel cell to perform power generation, and the supply control unit is configured to supply the raw fuel to both the fuel processing unit and the combustor.

5 Claims, 15 Drawing Sheets

(51) Int. Cl.
*H01M 8/04302* (2016.01)
*H01M 8/04082* (2016.01)
*H01M 8/04701* (2016.01)
*H01M 8/0606* (2016.01)
*H01M 8/0432* (2016.01)
*H01M 8/0612* (2016.01)
*H01M 8/04746* (2016.01)
*H01M 8/04223* (2016.01)

(52) U.S. Cl.
CPC ... *H01M 8/04302* (2016.02); *H01M 8/04708* (2013.01); *H01M 8/0606* (2013.01); *H01M 8/0432* (2013.01); *H01M 8/04268* (2013.01); *H01M 8/04328* (2013.01); *H01M 8/04373* (2013.01); *H01M 8/04753* (2013.01); *H01M 8/04776* (2013.01); *H01M 8/0618* (2013.01)

(58) Field of Classification Search
CPC ........... H01M 8/0606; H01M 8/04268; H01M 8/0432; H01M 8/04776; H01M 8/0618; H01M 8/04753; H01M 8/04373
See application file for complete search history.

(56) References Cited

U.S. PATENT DOCUMENTS

2014/0205866 A1\* 7/2014 Ogawa .............. H01M 8/04007
429/9
2016/0380290 A1 12/2016 Okamoto et al.

FOREIGN PATENT DOCUMENTS

| JP | 2014-154424 A | 8/2014 |
| JP | 2016-154067 A | 8/2016 |
| JP | 2017-10875 A | 1/2017 |

\* cited by examiner

US 11,695,130 B2

FUEL CELL SYSTEM AND FUEL CELL SYSTEM CONTROL METHOD

TECHNICAL FIELD

The present invention relates to a fuel cell system including a combustor for warming up a fuel cell, and a method for controlling the fuel cell system.

BACKGROUND ART

JP2016-154067A discloses switching a supply destination of a raw fuel between a start-up combustor and a reformer when starting a fuel cell system (paragraphs 0032, 0033). Specifically, a first fuel supply passage for supplying the raw fuel, being the fuel before reforming, to the start-up combustor and a second fuel supply passage for supplying the raw fuel to the reformer are provided, and when the temperature of the reformer is less than a reforming available temperature, the raw fuel is supplied to the start-up combustor through the first fuel supply passage to heat a fuel cell by heat energy of a combustion gas, while, after the temperature of the reformer reaches the reforming available temperature, the raw fuel is supplied to the reformer through the second fuel supply passage to achieve a further temperature rise of the fuel cell by heat energy produced by the power generation.

SUMMARY OF INVENTION

In a system including a fuel cell with a high operating temperature, such as a solid oxide fuel cell, it is necessary, for warming up the fuel cell, to produce a heat energy greater than that for a low-temperature operating fuel cell when starting the system. Herein, in order to shorten the time required for warming up the fuel cell, it is necessary to increase the supply flow rate of the raw fuel. In this regard, only by simply switching the supply destination of the raw fuel between the start-up combustor and the reformer, not only the start-up combustor but also the reformer need to be designed on the assumption of the fuel flow rate at the time of the start in order to cope with the increase in the fuel flow rate, resulting in disadvantage in terms of enhancing the efficiency of the entire system.

Further, in JP2016-154067A, there is no mention of control after the power generation by the fuel cell is enabled.

It is an object of the present invention to provide a fuel cell system and a method for controlling the fuel cell system, that take into account the problems described above.

According to one embodiment of the present invention, a fuel cell system comprising is provided. The fuel cell system of the embodiment includes: a fuel cell; a fuel processing unit configured to process a raw fuel to produce a fuel gas for the fuel cell; an oxidant gas heating unit configured to heat an oxidant gas for the fuel cell; a combustor configured to combust the raw fuel to produce a combustion gas for use in heating the fuel processing unit and the oxidant gas heating unit; a supply control unit configured to, during a warm-up of the fuel cell, control supply of the raw fuel to the fuel processing unit and the combustor; and a power generation control unit configured to control a power generation state during the warm-up of the fuel cell. When the fuel cell has reached a power generation available temperature, the power generation control unit is configured to cause the fuel cell to perform power generation, and the supply control unit is configured to supply the raw fuel to both the fuel processing unit and the combustor.

DESCRIPTION OF EMBODIMENTS

Hereinafter, embodiments of the present invention will be described with reference to the drawings.

(Overall Configuration of Fuel Cell System)

Figure 1:
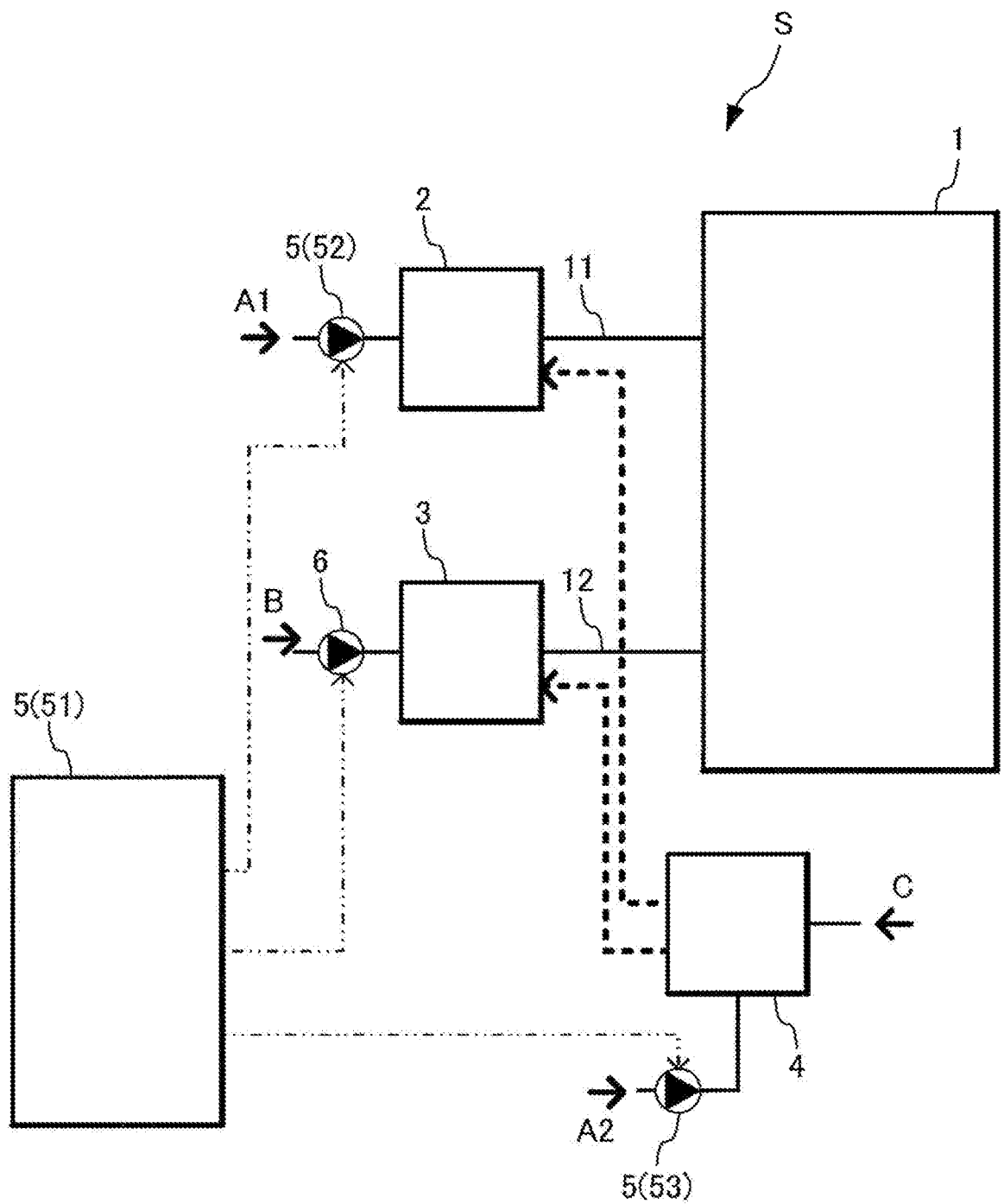
FIG. 1 is an explanatory diagram conceptually illustrating the configuration of a fuel cell system according to an embodiment of the present invention.

FIG. 1 conceptually illustrates the configuration of a fuel cell system S according to an embodiment of the present invention.

The fuel cell system S according to this embodiment (hereinafter referred to as a "fuel cell system S" or may simply be referred to as a "system S") includes a fuel cell stack 1, a fuel processing unit 2, an oxidant gas heating unit 3, a combustor 4, and a control unit 5.

The fuel cell stack (hereinafter may simply be referred to as a "stack") 1 is formed by stacking a plurality of fuel cells or fuel-cell unit cells, and the individual fuel cells serving as power generation sources are each, for example, a solid oxide fuel cell (SOFC). In the anode system, the fuel cell stack 1 is provided with an anode gas passage 11 for supplying a fuel gas to anode electrodes of the fuel cells, and an anode off-gas passage 11exh (not illustrated in FIG. 1) for the flow of anode off-gas after power generation reaction that is discharged from the anode electrodes. In the cathode system, the fuel cell stack 1 is provided with a cathode gas passage 12 for supplying an oxidant gas to cathode electrodes of the fuel cells, and a cathode off-gas passage 12*exh* (not illustrated) for the flow of cathode off-gas after power generation reaction that is discharged from the cathode electrodes.

The fuel processing unit 2 is for processing a raw fuel being a primary fuel to produce a fuel gas that is used for power generation reaction in the fuel cell. The fuel processing unit 2 is disposed in the anode gas passage 11 and supplied with the raw fuel (arrow A1).

The oxidant gas heating unit 3 is for heating an oxidant gas. The oxidant gas heating unit 3 is disposed in the cathode gas passage 12 and supplied with the oxidant gas (arrow B). The oxidant gas is, for example, air. By supplying the air in the atmosphere to the cathode electrode of the fuel cell, it is possible to supply oxygen to be used for power generation reaction to the cathode electrode. Suction of the oxidant gas or the air from the atmosphere into the cathode gas passage 12 is performed by, for example, an air suction means 6 such as an air compressor or a blower that is disposed near an open end of the cathode gas passage 12.

Herein, reactions for power generation in the anode electrode and the cathode electrode of the solid oxide fuel cell can be given by the following formulas.

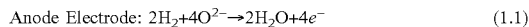

$$\text{Anode Electrode: } 2H_2 + 4O^{2-} \rightarrow 2H_2O + 4e^- \qquad (1.1)$$

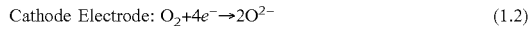

$$\text{Cathode Electrode: } O_2 + 4e^- \rightarrow 2O^{2-} \qquad (1.2)$$

The combustor 4 combusts the raw fuel for the fuel cell to produce a combustion gas. The combustor 4 is supplied with the raw fuel (arrow A2) and supplied with an oxidant for the raw fuel (arrow C). Heat energy produced by the combustion is supplied to the fuel processing unit 2 and the oxidant gas heating unit 3 and used for heating the raw fuel and the oxidant gas. In FIG. 1, transfer of the heat energy from the combustor 4 to the fuel processing unit 2 and the oxidant gas heating unit 3 is indicated by thick dotted lines. In this embodiment, the fuel cell stack 1 itself is not an object of direct heating by the combustion gas, but not limited to this, i.e. it can be configured that the heat energy of the combustion gas is directly transferred to the fuel cell stack 1 by housing the combustor 4 and the fuel cell stack 1 in a common heat-insulating case, or the like.

The control unit 5 controls the supply of the raw fuel to the fuel processing unit 2 and the combustor 4 and can be configured to include an electronic control unit. In this embodiment, the control unit 5 includes a controller 51 configured as an electronic control unit, a main fuel supply unit 52 for supplying the raw fuel to the fuel processing unit 2, and a sub fuel supply unit 53 for supplying the raw fuel to the combustor 4. The fuel supply units 52, 53 may each be an injector. In this embodiment, a first fuel injector is provided as the main fuel supply unit 52, and a second fuel injector is provided as the sub fuel supply unit 53. The first fuel injector 52 and the second fuel injector 53 are operated in response to control signals from the controller 51 and can continuously or intermittently supply the raw fuel to the fuel processing unit 2 and the combustor 4.

When starting the fuel cell system S, the controller 51 determines whether or not the fuel cell stack 1 or the fuel cells are in a state of being capable of power generation. This determination can be made based on, for example, the temperature of the fuel cell stack 1. When the fuel cell stack 1 is in the state of being capable of power generation, the controller 51 supplies the raw fuel to the fuel processing unit 2 through the first fuel injector 52 and supplies the raw fuel to the combustor 4 through the second fuel injector 53. That is, when, after the start, the temperature of the fuel cell stack 1 rises to reach the state where the fuel cell stack 1 is capable of power generation, the controller 51 starts the power generation by the fuel cell stack 1 and supplies the raw fuel to both the fuel processing unit 2 and the combustor 4. Consequently, it is possible not only to heat the fuel cell stack 1 by heat energy produced by the power generation, but also to promote the warm-up of the fuel cell stack 1 using as a heat source even a combustion gas produced by the combustor 4.

The control unit 5 forms a "supply control unit" and a "power generation control unit" according to this embodiment.

Figure 2:
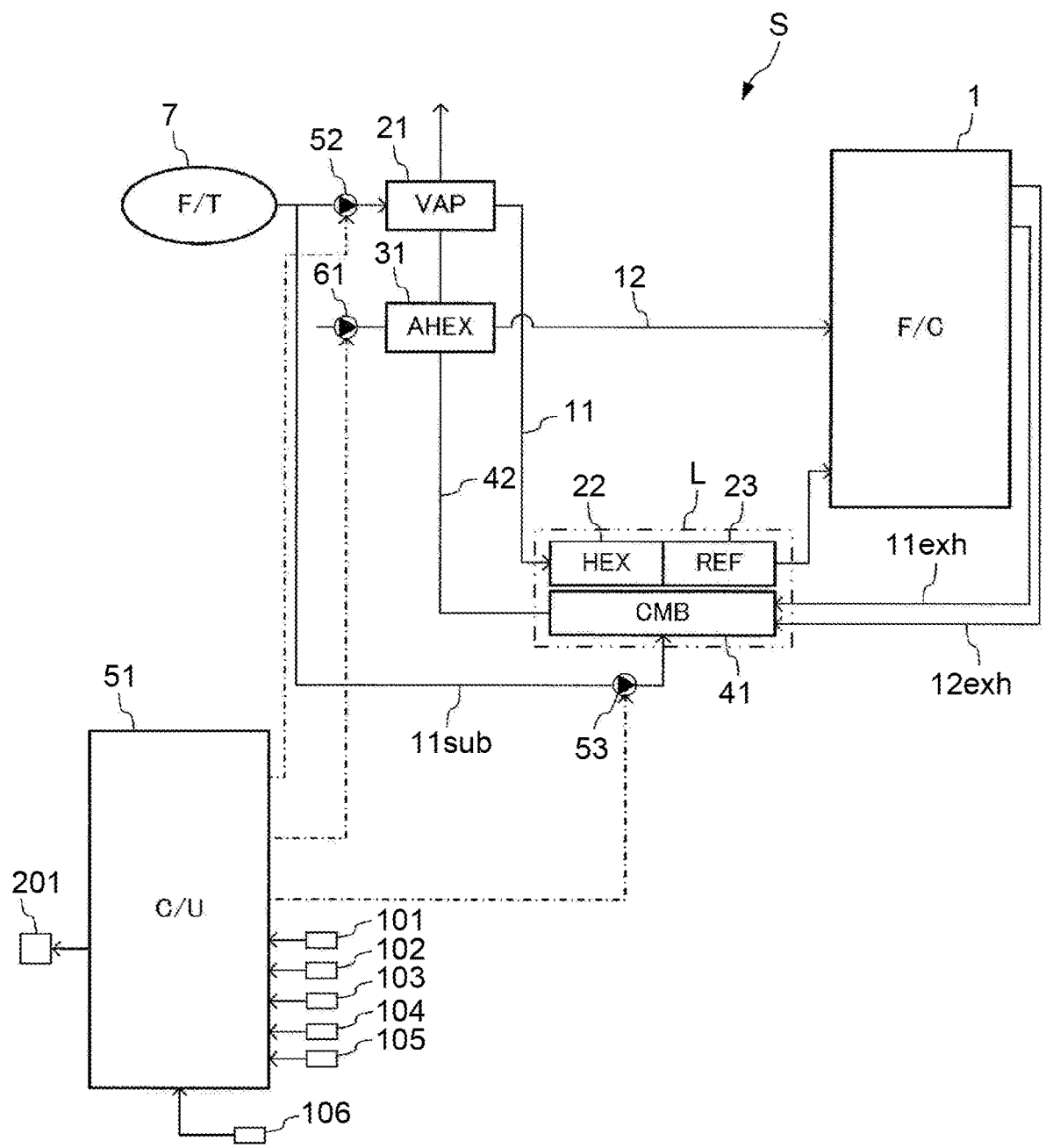
FIG. 2 is an explanatory diagram illustrating a specific configuration of the fuel cell system.

FIG. 2 illustrates a specific configuration of the fuel cell system S.

The fuel cell system S includes the solid oxide fuel cells (SOFCs) as the power generation sources and includes a fuel tank 7 that can be mounted on a vehicle. In this embodiment, the raw fuel being the primary fuel is a mixture of oxygenated fuel (e.g. ethanol) and water and is stored in the fuel tank 7. The fuel tank 7 and the fuel cell stack 1 are connected to each other through the anode gas passage 11. The anode gas passage 11 is provided with an evaporator 21, a fuel heat exchanger 22, and a reformer 23 in this order from upstream in the flow direction. On the other hand, a branch fuel passage 11 sub branches from the anode gas passage 11 on the upstream side of the evaporator 21 and is connected to a combustor 41. The first fuel injector 52 is disposed in the anode gas passage 11 between the branch point of the branch fuel passage 11 sub and the evaporator 21, and the second fuel injector 53 is disposed in the branch fuel passage 11 sub. Consequently, it is possible to switch the flow of the raw fuel between the anode gas passage 11 and the branch fuel passage 11 sub, while it is also possible to allow the raw fuel to flow through both the passages 11, 11 sub. The evaporator 21, the fuel heat exchanger 22, and the reformer 23 form a "fuel processing unit" according to this embodiment.

The evaporator 21 is supplied with the ethanol aqueous solution being the raw fuel from the fuel tank 7 and heats it to evaporate both the ethanol and the water, thereby producing an ethanol gas and a water vapor.

The fuel heat exchanger 22 receives heat energy of a combustion gas from the combustor 41 and heats the ethanol gas and the water vapor.

The reformer 23 includes a reforming catalyst and produces hydrogen by steam reforming from the ethanol in the gas phase. The steam reforming can be given by the following formula. The steam reforming is an endothermic reaction, and therefore, it is necessary to supply heat energy from the outside for the reforming. In this embodiment, as will be described later, remaining fuel in an anode off-gas is combusted in the combustor 41 also during the reforming so as to supply heat energy of a combustion gas to the reformer 23. In this embodiment, a fuel gas for the fuel cell is a mixed gas of hydrogen and carbon dioxide that are produced by reforming the ethanol.

$$C_2H_5OH + 3H_2O \rightarrow 6H_2 + 2CO_2 \qquad (2)$$

The oxidant gas heating unit 3 is formed by an air heat exchanger 31 and heats the oxidant gas, flowing in the cathode gas passage 12, by heat exchange with the combustion gas that is supplied from the combustor 41 through a combustion gas passage 42. In this embodiment, an air compressor 61 is disposed near the open end of the cathode gas passage 12 so that the air in the atmosphere as the oxidant gas is sucked into the cathode gas passage 12 through the air compressor 61. The sucked air rises in temperature from normal temperature (e.g. 25° C.) while passing through the air heat exchanger 31 and is supplied to the fuel cell stack 1.

The combustor 41 includes a combustion catalyst and is supplied with the ethanol aqueous solution being the raw fuel through the branch fuel passage 11 sub so as to produce a combustion gas by catalytic combustion of the ethanol. In this embodiment, it is configured that the combustor 41 and the evaporator 21 are connected to each other through the combustion gas passage 42, and that the fuel heat exchanger 22 and the reformer 23 are housed in a heat-insulating case (indicated by a two-dot chain line L) shared with the combustor 41 so that heat energy of the combustion gas is transferred to the fuel heat exchanger 22 and the reformer 23 inside the shared case L.

In this embodiment, the combustor 41 is connected to both the anode off-gas passage 11exh and the cathode off-gas passage 12exh each extending from the fuel cell stack 1, and therefore, when starting the fuel cell system S, it is possible to supply the oxidant gas to the combustor 41 through the cathode off-gas passage 12exh. Further, when reforming the raw fuel, it is possible to supply an anode off-gas and a cathode off-gas to the combustor 41 to allow remaining fuel (ethanol) in the anode off-gas to react with remaining oxygen in the cathode off-gas on the catalyst, so that it possible to heat the evaporator 21, the fuel heat exchanger 22, and the reformer 23 by the produced heat energy.

Electric power generated by the fuel cell stack 1 can be used for charging a battery or driving an external device such as an electric motor or a motor generator. For example, the fuel cell system S can be applied to a drive system of a vehicle so as to charge electric power generated by the rated operation of the fuel cell stack 1 to a battery and to supply electric power according to a target driving force of the vehicle from the battery to a traveling motor generator.

(Configuration of Control System)

The operations of the first fuel injector 52, the second fuel injector 53, the air compressor 61, and various other devices and components that are required for the operation of the fuel cell system S are controlled by the controller 51. In this embodiment, the controller 51 is configured as an electronic control unit composed of a microcomputer including a central processing unit, various storage devices such as a ROM and a RAM, an input/output interface, and so on.

In the normal operation (hereinafter simply referred to as "at the normal time"), the controller 51 sets a supply flow rate (hereinafter referred to as a "normal-time supply flow rate") of the raw fuel required for the rated operation of the fuel cell stack 1 and supplies the raw fuel of the normal-time supply flow rate to the fuel cell stack 1 through the first fuel injector 52. Herein, "at the normal time" refers to "in an operation after the warm-up of the fuel cell stack 1 is completed", and the rated operation of the fuel cell stack 1 refers to an operation of the fuel cell stack 1 at its maximum power generation output.

On the other hand, when the controller 51 detects the occurrence of a start request for the fuel cell system S based on a signal from a start switch 106, the controller 51 performs start control to perform the warm-up of the fuel cell stack 1. The warm-up of the fuel cell stack 1 refers to increasing the temperature of the fuel cell stack 1, which is at a low temperature (e.g. normal temperature) during the stop, to its operating temperature. The operating temperature of the solid oxide fuel cell is about 800 to 1000° C.

The controller 51 receives, as information relating to the start control, a signal from a stack temperature sensor 101 that detects a stack temperature $T_{stk}$, a signal from an air flow rate sensor 102 that detects an air flow rate $m_{air}$, a signal from an oxidant gas temperature sensor 103 that detects an oxidant gas temperature $T_{cth}$, a signal from a reformer temperature sensor 104 that detects a reformer temperature $T_{ref}$, a signal from a combustor temperature sensor 105 that detects a combustor temperature $T_{cmb}$, and so on.

The stack temperature $T_{stk}$ is an index indicating the temperature of the fuel cell stack 1 or the fuel cells. In this embodiment, the stack temperature sensor 101 is disposed near the cathode off-gas outlet of the fuel cell stack 1, and the temperature detected by the stack temperature sensor 101 is referred to as the stack temperature $T_{stk}$.

The air flow rate $m_{air}$ is the flow rate of the oxidant gas that is supplied to the fuel cell stack 1. In this embodiment, the air flow rate sensor 102 is disposed in the cathode gas passage 12, specifically, between the air compressor 61 and the air heat exchanger 31, and the flow rate detected by the air flow rate sensor 102 is referred to as the air flow rate $m_{air}$.

The oxidant gas temperature $T_{cth}$ is employed as the temperature having a correlation with the inlet temperature of the fuel cell stack 1. In this embodiment, the oxidant gas temperature sensor 103 is disposed near the oxidant gas inlet of the fuel cell stack 1, and the temperature detected by the oxidant gas temperature sensor 103 is referred to as the oxidant gas temperature $T_{cth}$.

The reformer temperature $T_{ref}$ is an index indicating the temperature of the catalyst included in the reformer 23. In this embodiment, the reformer temperature sensor 104 is disposed in the anode gas passage 11 downstream of the reformer 23, and the temperature detected by the reformer temperature sensor 104, i.e. the temperature of a fuel gas produced by the reforming, is referred to as the reformer temperature $T_{ref}$.

The combustor temperature $T_{cmb}$ is the temperature of a combustion gas produced by the combustor 4. In this embodiment, the combustor temperature sensor 105 is disposed in the combustion gas passage 42 between the combustor 41 and the air heat exchanger 31, and the temperature detected by the combustor temperature sensor 105 is referred to as the combustor temperature $T_{cmb}$.

The start control of the fuel cell system S will be specifically described below with reference to a flowchart.

(Description of Start Control)

Figure 3:
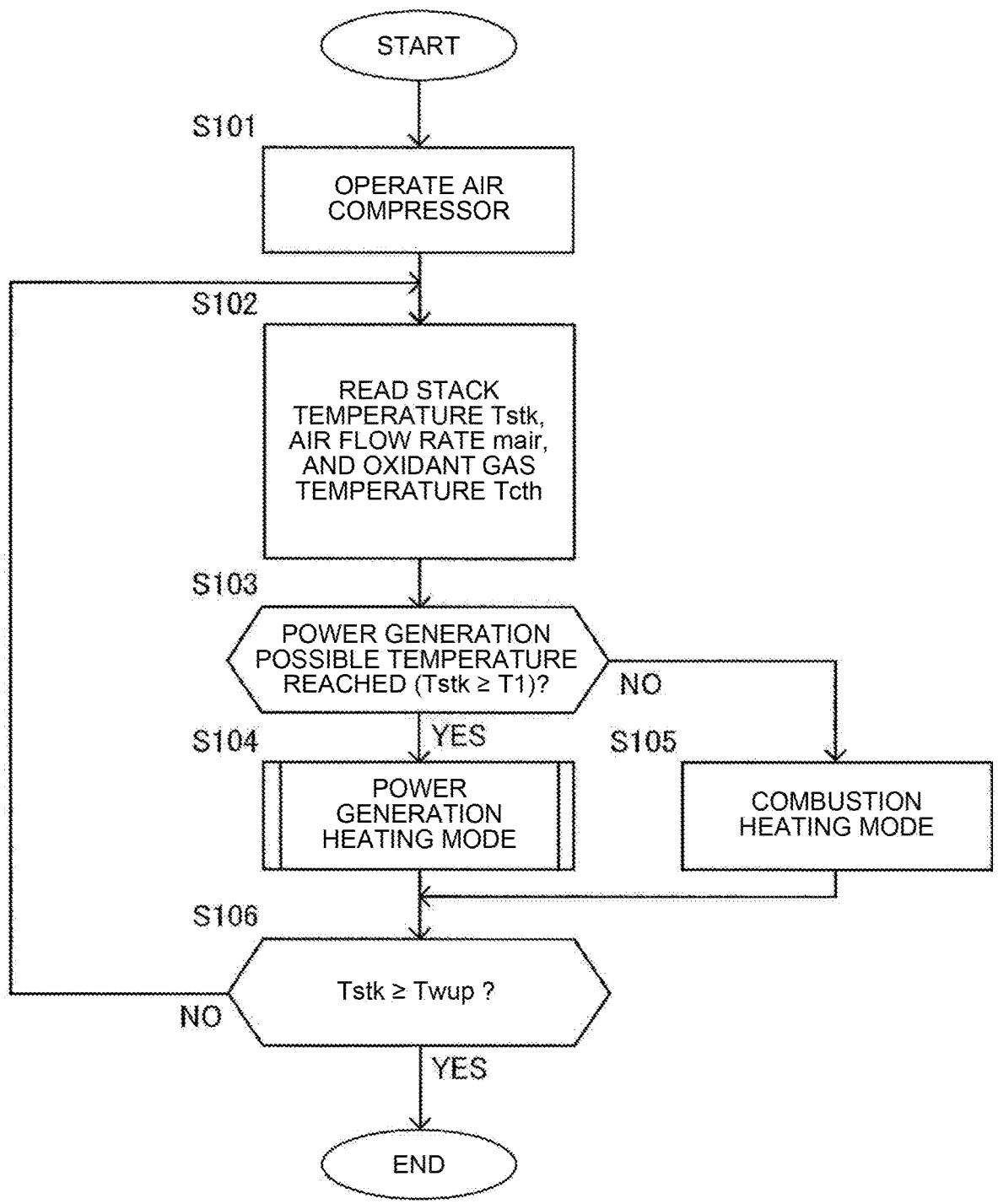
FIG. 3 is a flowchart illustrating the flow of start control of the fuel cell system.

FIG. 3 is a flowchart illustrating the flow of the start control of the fuel cell system S according to this embodiment.

The controller 51 is programmed to perform the start control of the fuel cell system S according to the flowchart illustrated in FIG. 3 in response to an input of a start request signal from the start switch 106 based on an operation of the start switch 106 by a driver. In this embodiment, the controller 51 starts the start control in response to the input of the start request signal and ends the start control by a determination that the warm-up of the fuel cell stack 1 or the fuel cells is completed.

At S101, the air compressor 61 is operated. Consequently, the air in the atmosphere is sucked into the cathode gas passage 12 and supplied to the cathode electrode of the fuel cell stack 1 through the air heat exchanger 31.

At S102, the stack temperature $T_{stk}$, the air flow rate $m_{air}$, and the oxidant gas temperature $T_{cth}$ are read as information relating to the start control.

At S103, it is determined whether or not the fuel cell stack 1 is in a state of being capable of power generation.

Specifically, it is determined whether or not, after starting the start control, the stack temperature $T_{stk}$ rises to reach a lower limit temperature (hereinafter referred to as a "power generation start temperature") T1 that enables the power generation of the fuel cell stack 1. When the stack temperature $T_{stk}$ has reached the power generation start temperature T1, the start control proceeds to S104, and when it has not reached the power generation start temperature T1, the start control proceeds to S105. The power generation start temperature T1 is, for example, 500° C.

At S104, a power generation heating mode is selected and performed as an operating mode during the warm-up. The power generation heating mode is an operating mode that mainly uses heat energy produced by the power generation of the fuel cell stack 1. In the power generation heating mode, the controller 51 controls a power converter 201 (FIG. 1) interposed between the fuel cell stack 1 and the battery or the auxiliary machine to perform output from the fuel cell stack 1. Herein, the air compressor 61 can be given as the auxiliary machine by way of example.

At S105, a combustion heating mode is selected and performed as an operating mode during the warm-up. The combustion heating mode is an operating mode that mainly uses heat energy produced by combustion in the combustor 41.

At S106, it is determined whether or not the warm-up of the fuel cell stack 1 is completed. Specifically, it is determined whether or not the stack temperature $T_{stk}$ has reached a predetermined temperature $T_{wup}$ which is for determining the completion of the warm-up. When the stack temperature $T_{stk}$ has reached the predetermined temperature $T_{wup}$, the start control is ended by determining that the warm-up of the fuel cell stack 1 is completed, thereby shifting to control at the normal time. At the normal time, the fuel cell stack 1 is operated at the rated output. When the predetermined temperature $T_{wup}$ is not reached, the start control returns to S102 to repeat the processes of S102 to 105 while continuously operating the air compressor 61.

Figure 4:
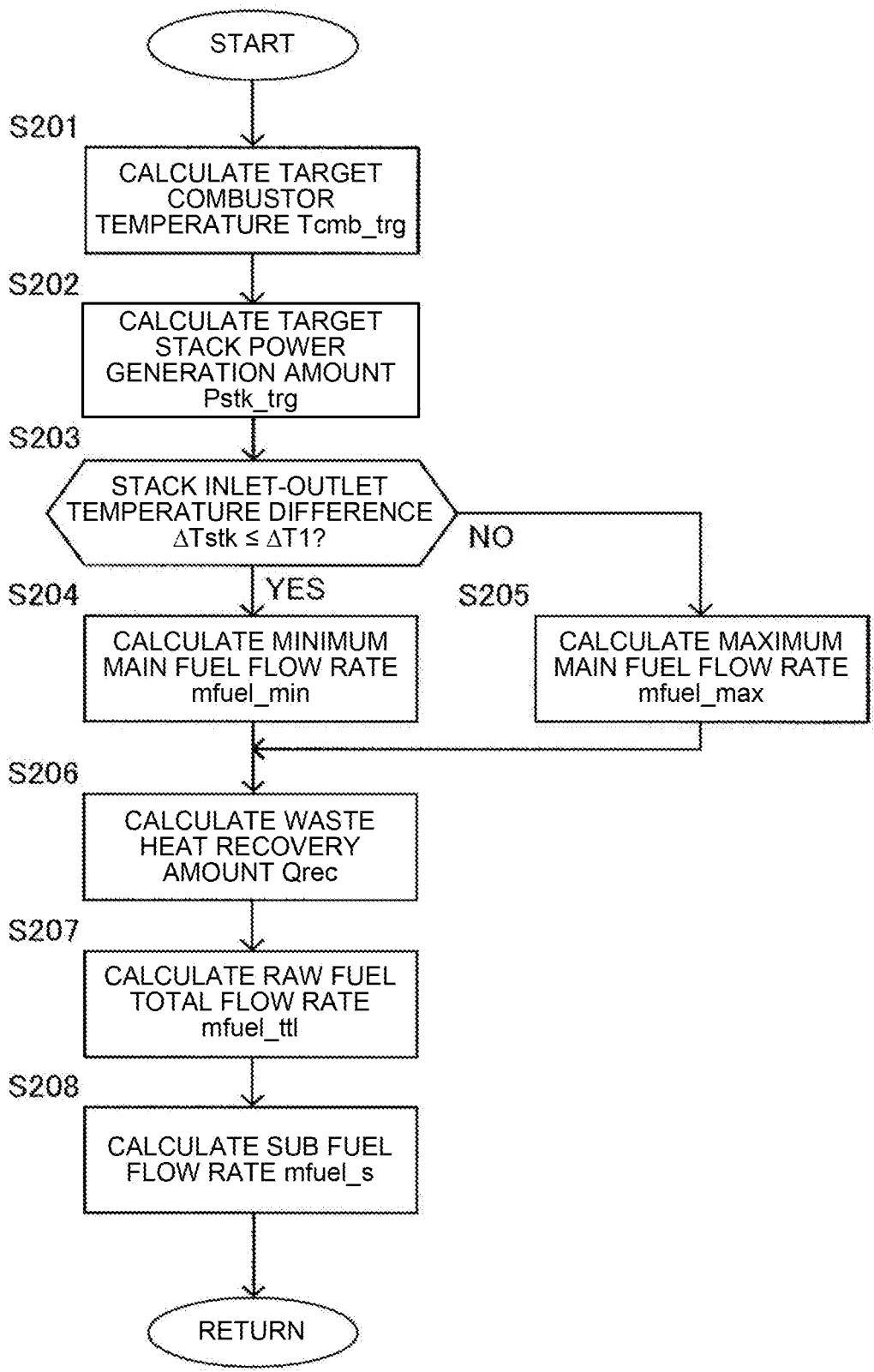
FIG. 4 is a flowchart illustrating the flow of processing in a power generation heating mode.

FIG. 4 is a flowchart illustrating the flow of processing in the power generation heating mode (S104 in FIG. 3).

At S201, a target temperature of the combustor 41 (hereinafter referred to as a "target combustor temperature $T_{cmb\_trg}$") is calculated. The target combustor temperature $T_{cmb\_trg}$ is the target temperature of a combustion gas that is produced by the combustor 41, and is calculated based on the stack temperature $T_{stk}$. Specifically, as the target temperature of the combustion gas that gives the maximum temperature of the oxidant gas that is allowed to flow into the fuel cell stack 1, the target combustor temperature $T_{cmb\_trg}$ is calculated by the following formula, i.e. by adding temperature differences $\Delta T_{stk\_set}$ and $\Delta T_{ahx\_set}$ to the stack temperature $T_{stk}$ being the temperature near the cathode off-gas outlet of the fuel cell stack 1. Herein, the temperature difference $\Delta T_{stk\_set}$ is a set value of the temperature difference between the oxidant gas inlet and the cathode off-gas outlet of the fuel cell stack 1 (hereinafter referred to as a "stack inlet-outlet temperature difference"), and the temperature difference $\Delta T_{ahx\_set}$ is a set value of the temperature difference between the combustion gas inlet and the oxidant gas outlet of the air heat exchanger 31. The temperature difference $\Delta T_{stk\_set}$ is the temperature difference (e.g. 300° C.) that is allowed in terms of heat load to the fuel cell, and the temperature difference $\Delta_{ahx\_set}$ is the temperature difference (e.g. 150° C.) that is given by the air heat exchanger 31 in the rated operation of the fuel cell stack 1.

$$T_{cmb\_trg}=T_{stk}+\Delta T_{stk\_set}+\Delta T_{ahx\_set} \quad (3)$$

Figure 7:
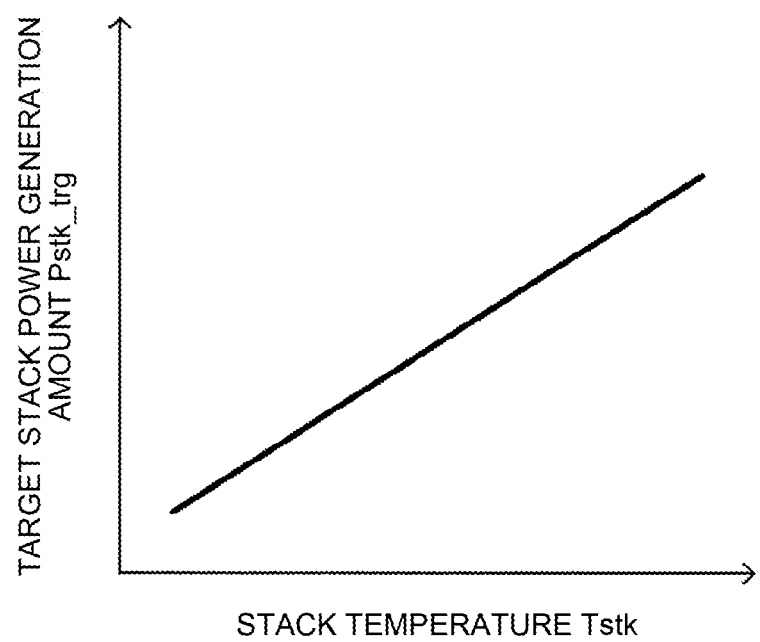
FIG. 7 is an explanatory diagram illustrating the relationship between the temperature and the target power generation amount of the fuel cell stack.

At S202, a target power generation amount of the fuel cell stack 1 (hereinafter referred to as a "target stack power generation amount $P_{stk\_trg}$") is calculated. The target stack power generation amount $P_{stk\_trg}$ is set to the maximum power generation amount that can be output by the fuel cell stack 1 according to its temperature, and is calculated by, for example, retrieval from table data with a trend illustrated in FIG. 7. The target stack power generation amount $P_{stk\_trg}$ is set to a greater value as the stack temperature $T_{stk}$ is higher.

Figure 5:
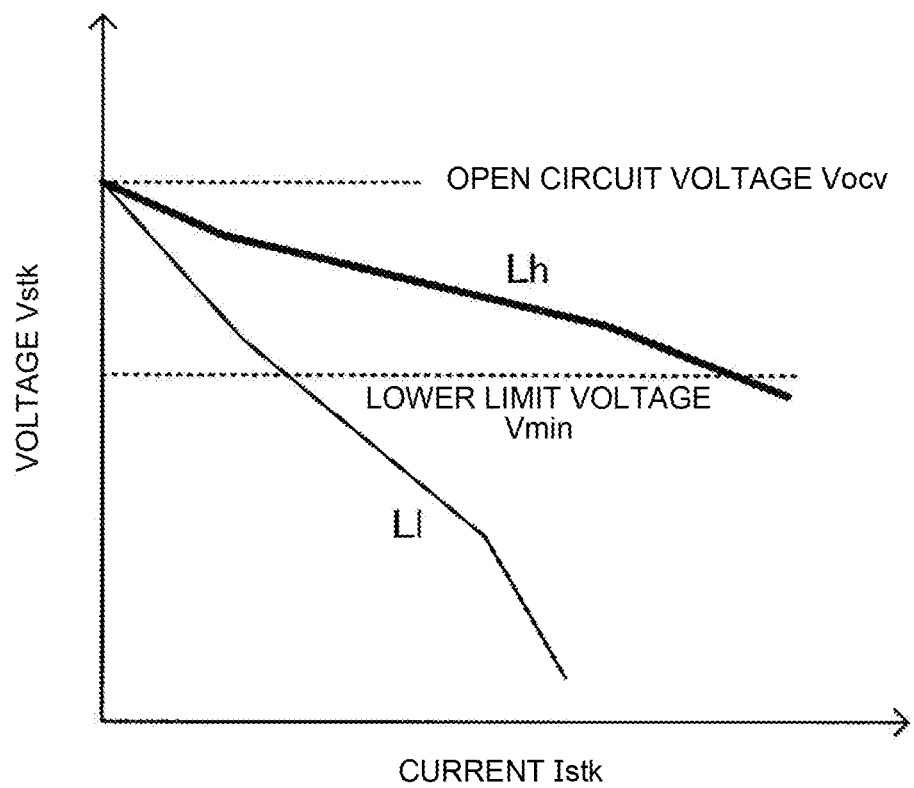
FIG. 5 is an explanatory diagram illustrating the relationship between the current and the voltage of a fuel cell stack according to the temperature.
Figure 6:
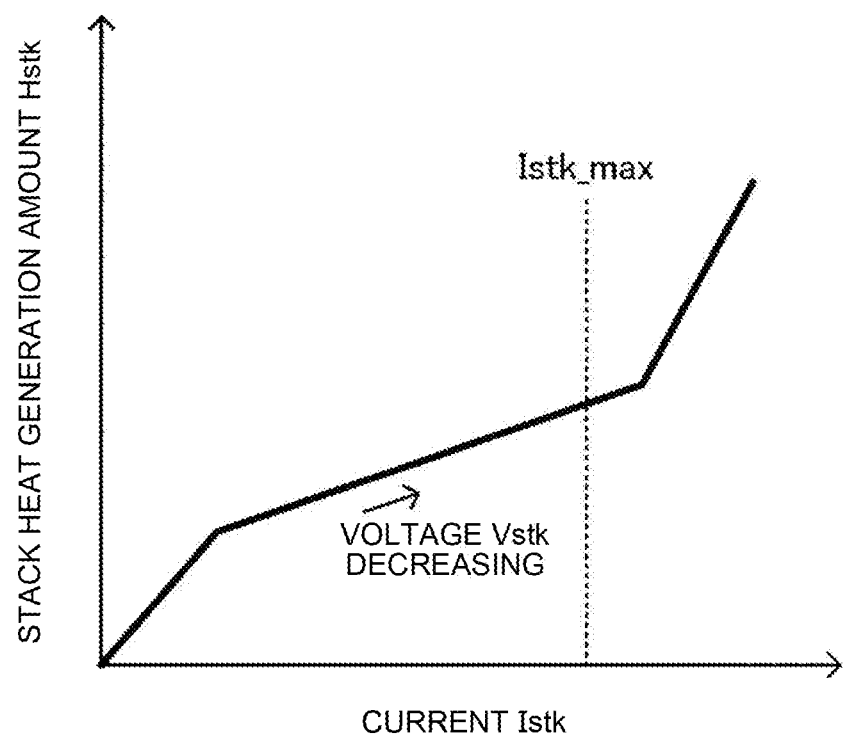
FIG. 6 is an explanatory diagram illustrating the relationship between the current and the heat generation amount of the fuel cell stack.

The setting of the target stack power generation amount $P_{stk\_trg}$ will be further described. FIG. 5 illustrates the current-voltage characteristics of the fuel cell stack 1. The characteristics at a low temperature are indicated by a thin solid line L1, and the characteristics at a high temperature or at the normal time are indicated by a thick solid line Lh. In the fuel cell stack 1, as the temperature rises, the characteristics are recovered and the current $I_{stk}$ at a power generation possible lower limit voltage Vmin also increases. FIG. 6 illustrates the relationship between the current $I_{stk}$ and the heat generation amount $H_{stk}$ of the fuel cell stack 1. The stack heat generation amount $H_{stk}$ tends to increase as the current $I_{stk}$ increases, i.e. as the voltage $V_{stk}$ decreases. Therefore, the stack heat generation amount $H_{stk}$ becomes the maximum when the fuel cell stack 1 performs the power generation at the lower limit voltage Vmin. From the trends illustrated in FIGS. 5 and 6, it is possible to obtain the relationship illustrated in FIG. 7.

At S203, it is determined whether or not a stack inlet-outlet temperature difference $\Delta T_{stk}$ is equal to or less than a predetermined value $\Delta T1$. The stack inlet-outlet temperature difference $\Delta T_{stk}$ is calculated by subtracting the stack temperature $T_{stk}$ from the oxidant gas temperature $T_{cth}$ ($\Delta T_{stk}=T_{cth}-T_{stk}$). When the stack inlet-outlet temperature difference $\Delta T_{stk}$ is equal to or less than the predetermined value $\Delta T1$, the start control proceeds to S204, and when it is greater than the predetermined value $\Delta T1$, the start control proceeds to S205. The predetermined value $\Delta T1$ is, for example, the allowable temperature difference upper limit value $\Delta T_{stk\_set}$ (e.g. 300° C.).

At S204, the flow rate of the raw fuel that is supplied through the first fuel injector 52 (hereinafter referred to as a "main fuel flow rate $m_{fuel\_m}$") is set to a minimum main fuel flow rate $m_{fuel\_min}$. The minimum main fuel flow rate $m_{fuel\_min}$ can be set in advance, by adaptation through experiments or the like, as a lower limit value that can suppress degradation that occurs in the fuel cell stack 1 due to a reduction in the supply flow rate of the raw fuel. Herein, as the degradation to be considered, there can be cited, for example, the degradation of the electrode due to shortage of a fuel gas (called "the fuel starvation"). By setting to the minimum main fuel flow rate $m_{fuel\_min}$, the ratio of the raw fuel that is supplied to the fuel processing unit 2 becomes the minimum in the flow rate of the raw fuel that is supplied to the entire system during the warm-up (hereinafter referred to as a "raw fuel total flow rate $m_{fuel\_ttl}$"), i.e. the ratio of the raw fuel that is supplied to the combustor 41 becomes the maximum.

Figure 8:
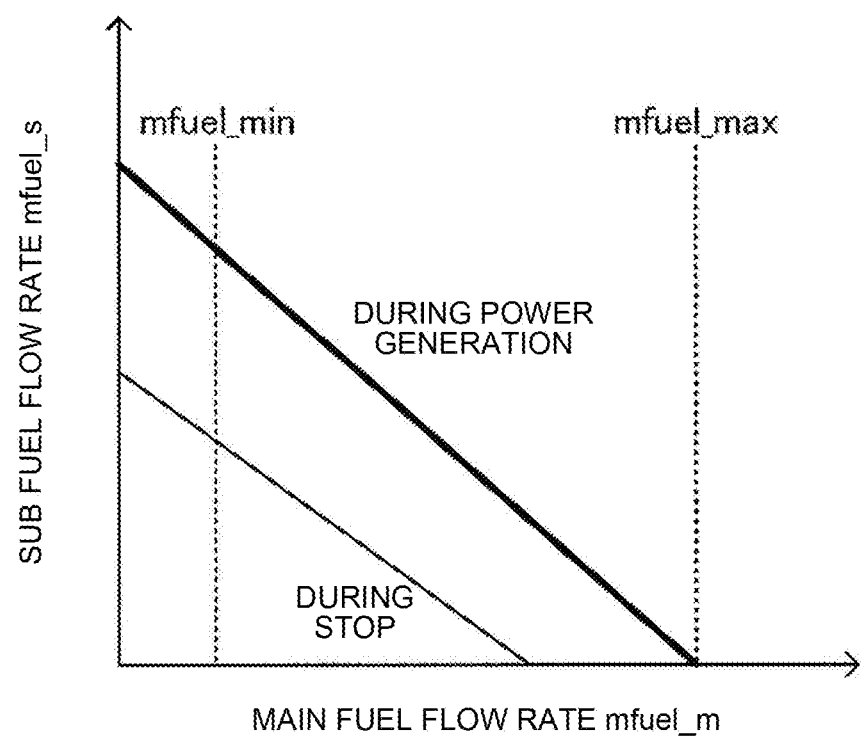
FIG. 8 is an explanatory diagram illustrating the relationships between the main fuel flow rate and the sub fuel flow rate during the system stop and during the power generation.

FIG. 8 illustrates the relationships between the main fuel flow rate $m_{fuel\_m}$ and the sub fuel flow rate $m_{fuel\_s}$ during the system stop (before the start of power generation) and during the power generation, respectively. As illustrated in FIG. 8, during the power generation, it is necessary to increase the raw fuel total flow rate $m_{fuel\_ttl}$ compared to during the system stop for compensation for consumption by the power generation. The minimum main fuel flow rate $m_{fuel\_min}$ and a maximum main fuel flow rate $m_{fuel\_max}$ described subsequently can be determined on a thick solid line indicating "during the power generation". In this embodiment, the minimum main fuel flow rate $m_{fuel\_min}$ is set to a constant value.

Figure 9:
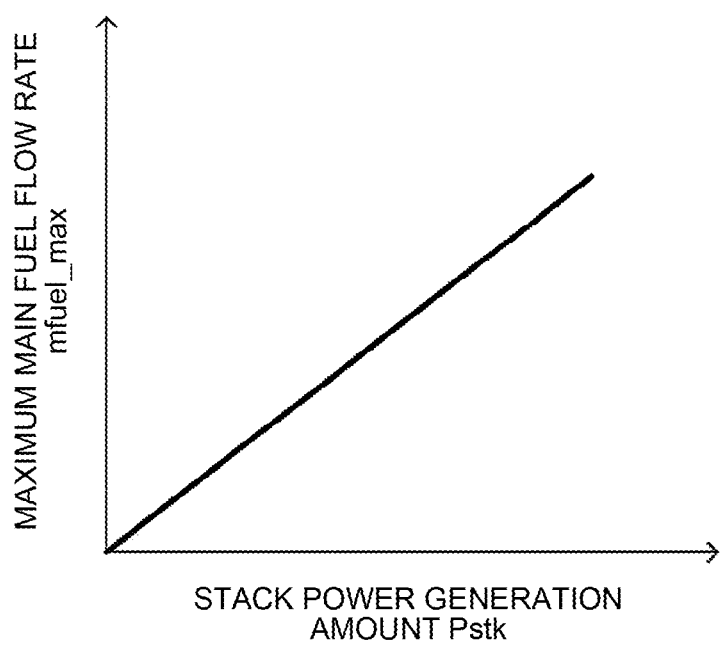
FIG. 9 is an explanatory diagram illustrating the relationship between the power generation amount of the fuel cell stack and the main fuel flow rate.

At S205, the main fuel flow rate $m_{fuel\_m}$ is set to the maximum main fuel flow rate $m_{fuel\_max}$. The maximum main fuel flow rate $m_{fuel\_max}$ can be set in advance, by adaptation through experiments or the like, as an upper limit value that can suppress an adverse effect that occurs in the fuel cell stack 1 or the combustor 41 due to oversupply of the fuel. In this embodiment, by retrieval from table data with a trend illustrated in FIG. 9, the maximum main fuel flow rate $m_{fuel\_max}$ is set to a greater value as the stack power generation amount $P_{stk}$ is higher. By setting to the maximum main fuel flow rate $m_{fuel\_max}$, the ratio of the raw fuel that is supplied to the fuel processing unit 2 becomes the maximum in the raw fuel total flow rate $m_{fuel\_ttl}$.

At S206, a recovery amount of heat energy of a fuel gas by an anode gas that flows through the fuel processing unit 2 (hereinafter referred to as a "waste heat recovery amount $Q_{rec}$") is calculated. Since the waste heat recovery amount generally tends to increase as the main fuel flow rate $m_{fuel\_m}$ increases, the waste heat recovery amount $Q_{rec}$ can be calculated as a function of the main fuel flow rate $m_{fuel\_m}$. Alternatively, the waste heat recovery amount $Q_{rec}$ may be set to a constant value.

At S207, the raw fuel total flow rate $m_{fuel\_ttl}$ is calculated. The calculation of the raw fuel total flow rate $m_{fuel\_ttl}$ is performed by the following formulas. The following formulas show that the heat balance of the entire system, into which heat energy is input by supply of the raw fuel through the first and second fuel injectors 52, 53, is basically achieved.

$$m_{fuel\_ttl} = A/B \tag{4.1}$$

$$A = m_{air} \times \{h_{air}(T_{cmb}) - h_{air}(T_{stk})\} + m_{h2c} \times \{h_{h2}(T_{stk}) - h_{h2o}(T_{stk})\} - Q_{rec} \tag{4.2}$$

$$B = (1/5) \times h_{c2h5ohl}(T_{fuel}) + (4/5) \times h_{h2ol}(T_{fuel}) - (2/5) \times h_{co2}(T_{cmb}) - (7/5) \times h_{h2o}(T_{cmb}) + (3/5) \times h_{o2}(T_{cmb}) \tag{4.3}$$

Herein, an ethanol aqueous solution is used as a raw fuel, and the mixing ratio of ethanol and water in the ethanol aqueous solution is set to 1:4 in molar conversion. Further, the temperature of the raw fuel is set to 25° C. ($T_{fuel}$=25).

Variables in the above formulas (4.1) to (4.3) are respectively as follows.

$m_{fuel\_ttl}$: raw fuel total flow rate (molar conversion value)
$m_{air}$: molar flow rate of air
$m_{h2c}$: hydrogen consumption amount by power generation
$Q_{rec}$: waste heat recovery amount of anode gas
$T_{stk}$: outlet temperature of the fuel cell stack
$T_{cmb}$: temperature of combustion gas
$T_{fuel}$: temperature of raw fuel
$h_{air}$ (T): enthalpy of air
$h_{c2h5ohl}$ (T): enthalpy of ethanol (liquid)
$h_{h2ol}$ (T): enthalpy of water (liquid)
$h_{co2}$ (T): enthalpy of carbon dioxide
$h_{h2o}$ (T): enthalpy of water (gas)
$h_{o2}$ (T): enthalpy of oxygen The above formula (4.2) can be expressed as follows, taking into account a mass transfer amount inside the fuel cell stack 1 (specifically, an oxygen transfer amount $2m_{h2c} \times h_{o2}$ ($T_{stk}$) between the electrodes due to the power generation).

$$A = m_{air} \times \{h_{air}(T_{cmb}) - h_{air}(T_{stk})\} - 2m_{h2c} \times h_{o2}(T_{stk}) + \{2m_{h2c} \times h_{o2}(T_{stk}) - Q_{rec} - Q_{stk}\} - P \tag{4.2a}$$

$Q_{stk}$: heat energy change amount of anode gas inside the fuel cell stack 1
P: power generation amount As the heat energy change amount $Q_{stk}$, there can be cited, for example, a heat receiving amount of the anode gas due to the power generation of the fuel cell stack 1 and a heat absorption amount thereof due to internal reforming.

The raw fuel total flow rate $m_{fuel\_ttl}$ is calculated from the above formulas (4.1), (4.2a), and (4.3).

Herein, when calculating the raw fuel total flow rate $m_{fuel\_ttl}$, the following relationship may be considered. The following formulas show that the heat balance of the anode gas is achieved between the input and the output of the fuel cell stack 1. The third and fourth terms ($\{2m_{h2c} \times h_{o2}(T_{stk}) - Q_{rec} - Q_{stk}\} - P$) of the right side of the above formula (4.2a), indicating a change amount of heat energy of the anode gas inside the fuel cell stack 1, can be approximated by the following formulas.

$$C = D \tag{5.1}$$

$$C = m_{fuel\_m} \times \{(1/5) \times h_{c2h5ohl}(T_{fuel}) + (4/5) \times h_{h2ol}(T_{fuel})\} + \{2m_{h2c} \times h_{o2}(T_{stk}) - Q_{rec} - Q_{stk}\} - P \tag{5.2}$$

$$D = m_{fuel\_m} \times \{F_{h2}(T_{stk}, m_{h2c}) \times h_{h2}(T_{stk}) + F_{ch4}(T_{stk}, m_{h2c}) \times h_{ch4}(T_{stk}) + F_{co}(T_{stk}, m_{h2c}) \times h_{co}(T_{stk}) + F_{co2}(T_{stk}, m_{h2c}) \times h_{co2}(T_{stk}) + F_{h2o}(T_{stk}, m_{h2c}) \times h_{h2o}(T_{stk})\} \tag{5.3}$$

F: composition of fuel gas per mole of ethanol
F (T, $m_{h2c}$): composition of fuel gas in consideration of mass transfer amount inside the fuel cell stack At S208, the flow rate of the raw fuel that is supplied through the second fuel injector 53 (hereinafter referred to as a "sub fuel flow rate $m_{fuel\_s}$") is calculated. Specifically, the sub fuel flow rate $m_{fuel\_s}$ is calculated by subtracting the main fuel flow rate $m_{fuel\_m}$ from the raw fuel total flow rate $m_{fuel\_ttl}$ ($m_{fuel\_s} = m_{fuel\_ttl} - m_{fuel\_m}$).

The controller 51 sets command signals according to the main fuel flow rate $m_{fuel\_m}$ and the sub fuel flow rate $m_{fuel\_s}$ and outputs them to the first fuel injector 52 and the second fuel injector 53.

In this embodiment, the controller 51, the first fuel injector 52, and the second fuel injector 53 form a "supply control unit", and the controller 51 forms a "power generation control unit". Specifically, the function of "the power generation control unit" is realized as the process of S104 (control of the power converter) of the flowchart illustrated in FIG. 3, and the function of "the supply control unit" is realized as the processes of S102 to 104 of the flowchart illustrated in FIG. 3 and the entire flowchart illustrated in FIG. 4. Further, the function of a "warm-up target flow rate setting unit" is realized as the processes of S102 of the flowchart illustrated in FIGS. 3 and S201 to 207 of the flowchart illustrated in FIG. 4, the function of a "target combustion gas temperature setting unit" is realized as the process of S201 of the flowchart illustrated in FIG. 4, and the function of a "fuel cell temperature detection unit" is realized as the process of S102 illustrated in FIG. 3. Further, the execution of the process of S204 of the flowchart illustrated in FIG. 4 corresponds to a "second supply mode", and the execution of the process of S205 thereof corresponds to a "first supply mode".

(Description of Operation of Fuel Cell System)

Figure 10:
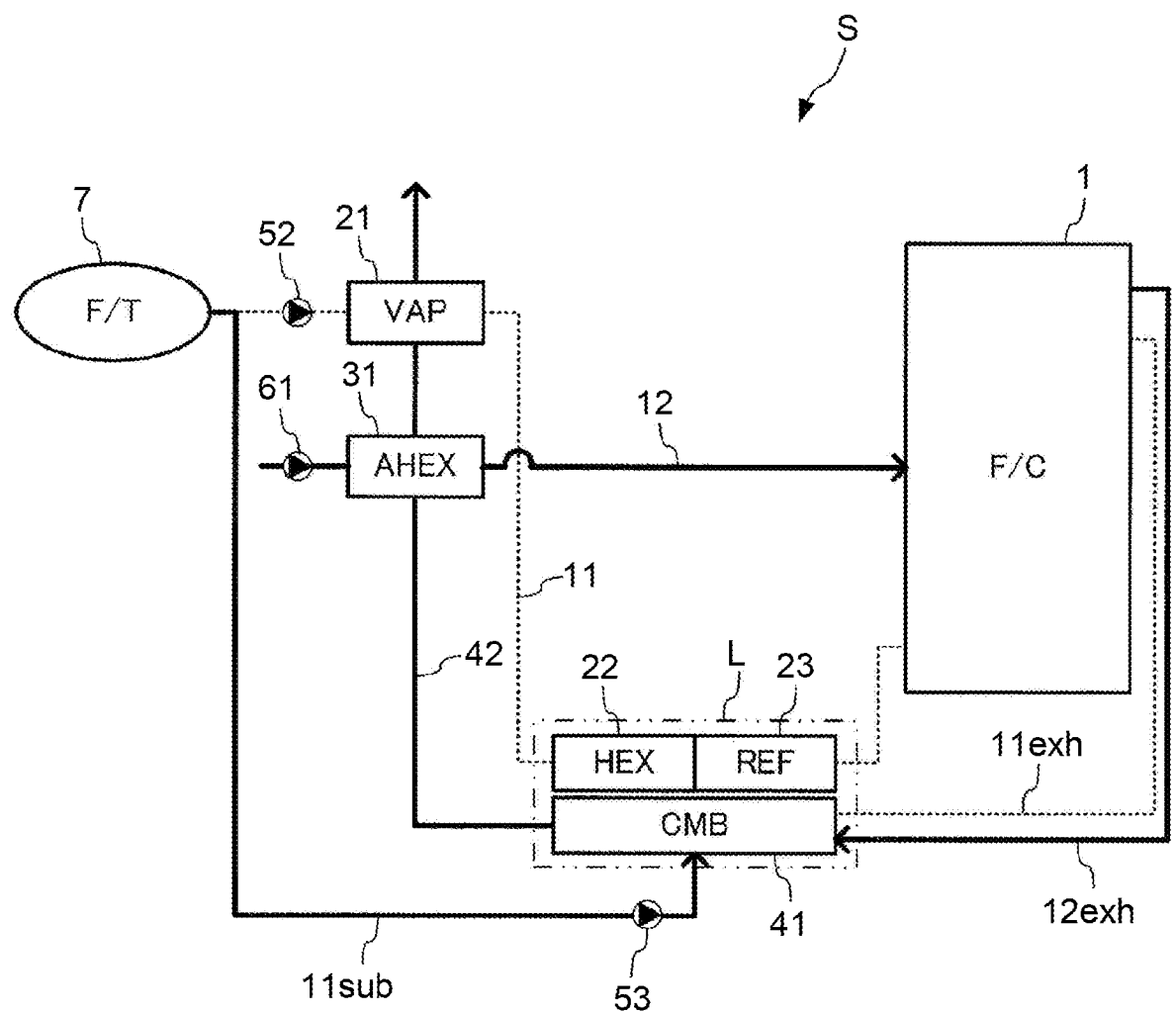
FIG. 10 is an operation explanatory diagram (PRD1) of the start control.
Figure 11:
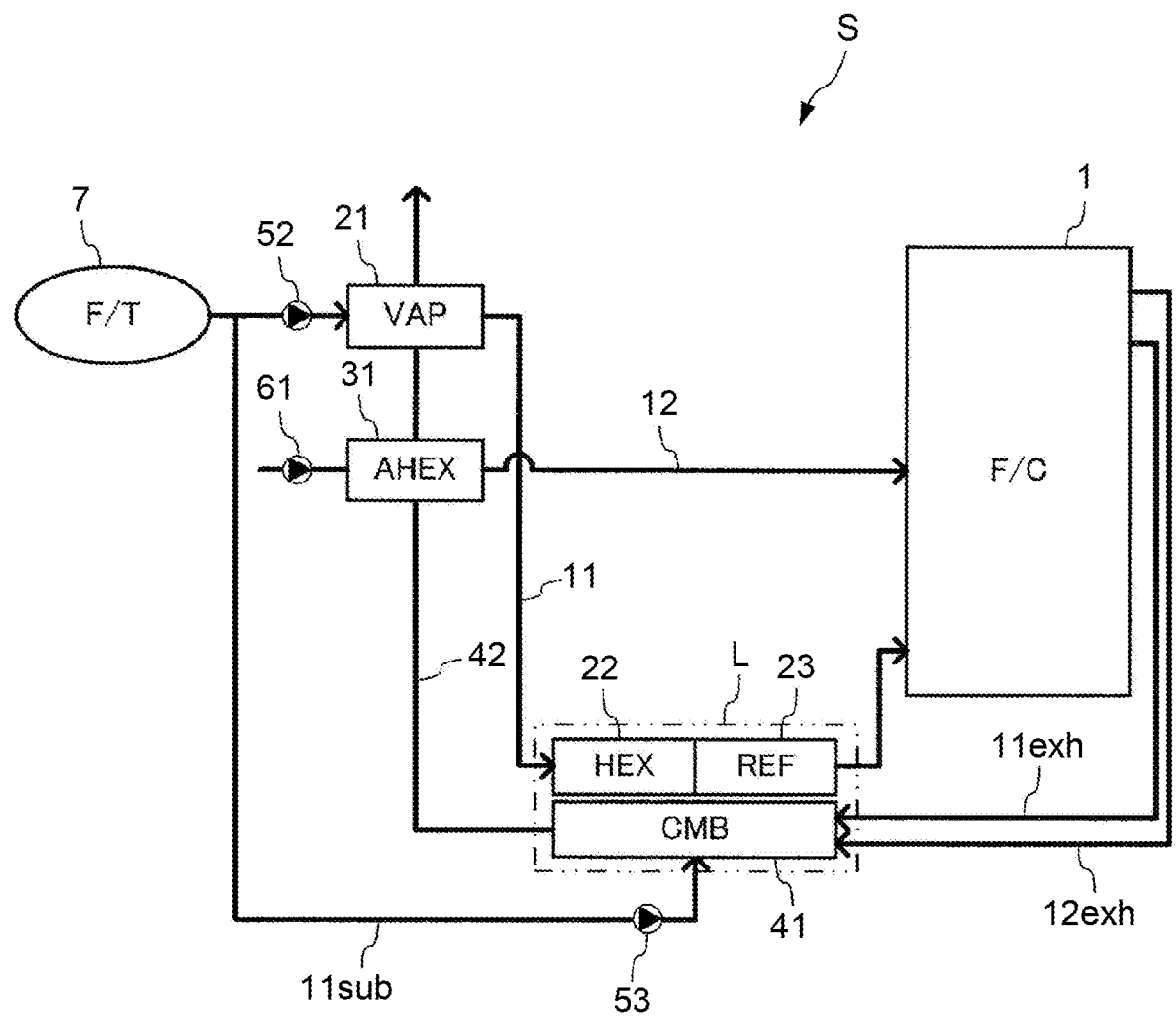
FIG. 11 is an operation explanatory diagram (PRD4) of the start control.
Figure 12:
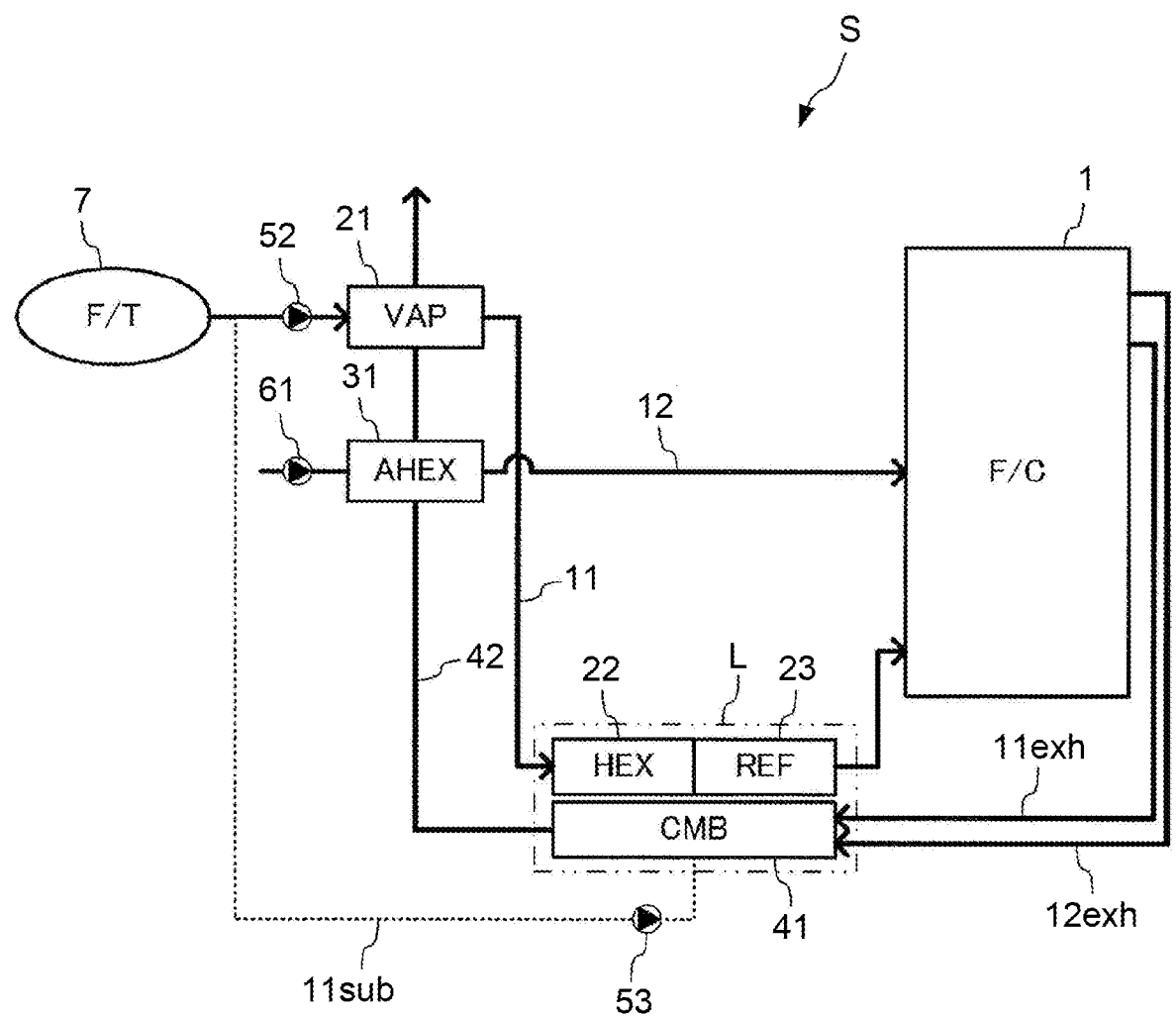
FIG. 12 is an operation explanatory diagram of control at the normal time after the start.

FIGS. 10 to 12 illustrate the operations of the fuel cell system S at the start.

FIG. 10 illustrates the operation at the start (before the start of power generation of the fuel cell stack 1), FIG. 11 illustrates the operation at the start after the start of the power generation, and FIG. 12 illustrates the operation at the normal time after the start. In FIGS. 10 to 12, a passage in which a gas is actually flowing is indicated by a thick solid line, and a passage in which the flow of gas is stopped is indicated by a thin dotted line.

Figure 13:
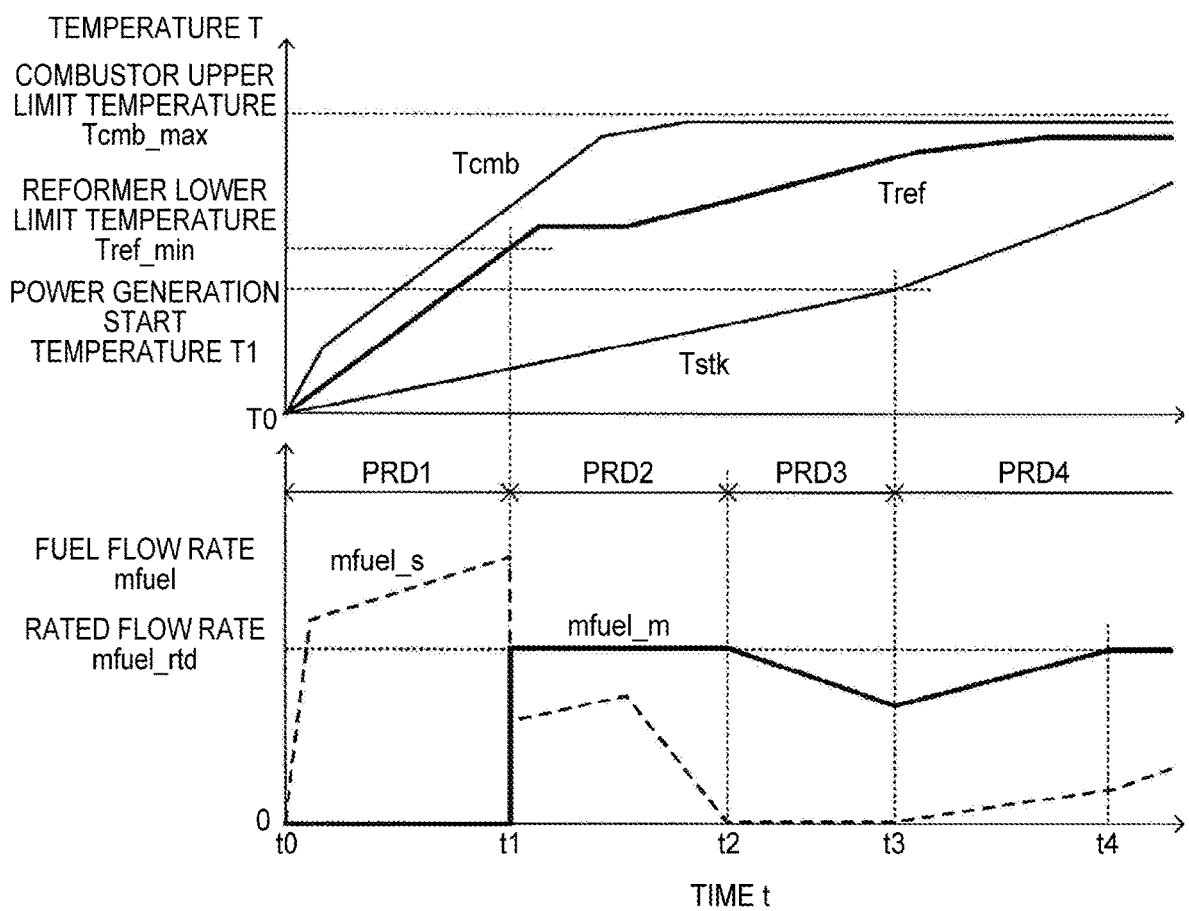
FIG. 13 is a time chart illustrating changes of a combustor temperature $T_{cmb}$, a stack temperature $T_{stk}$, and fuel flow rates $m_{fuel}$ (a main fuel flow rate $m_{fuel\_m}$ and a sub fuel flow rate $m_{fuel\_s}$) in the start control.

FIG. 13 illustrates the operations of the fuel cell system S at the start (PRD1 to PRD4) by a time chart, wherein the upper row illustrates changes of the combustor temperature $T_{cmb}$, the reformer temperature $T_{ref}$, and the stack temperature $T_{stk}$, and the lower row illustrates changes of the fuel flow rates $m_{fuel}$. In the lower row of the time chart, the main fuel flow rate $m_{fuel\_m}$ is indicated by a solid line, and the sub fuel flow rate $m_{fuel\_s}$ is indicated by a dotted line. The period PRD1 represents a period in which the reformer 23 is not in a state of being capable of reforming, and the periods PRD2 to PRD4 represent periods in which the reformer 23 is in the state of being capable of reforming. Further, the periods PRD1 to PRD3 represent periods in which the fuel cell stack 1 is not in a state of being capable of power generation, and the period PRD4 represents a period in which the fuel cell stack 1 is in the state of being capable of power generation.

Referring to FIG. 13 as appropriate, the start control according to this embodiment will be described.

Through the overall start control, the temperature of the combustor 41 (the combustor temperature $T_{cmb}$) is limited to equal to or less than a combustor upper limit temperature $T_{cmb\_max}$. The limitation of the combustor temperature $T_{cmb}$ is performed by, for example, limiting the target combustor temperature $T_{cmb\_trg}$, that is set by the process of S201 illustrated in FIG. 4, to equal to or less than the combustor upper limit temperature $T_{cmb\_max}$. As the combustor upper limit temperature $T_{cmb\_max}$, there can be cited, for example, an upper limit temperature that can suppress degradation of a catalyst (e.g. oxidation catalyst) provided in the combustor 41.

After starting the start control, in the period PRD1 in which the reformer temperature $T_{ref}$ has not reached a reformer lower limit temperature $T_{ref\_min}$, the supply of the raw fuel through the first fuel injector 52 is stopped, and the raw fuel that is required for warming up the fuel cell stack 1 is supplied to the combustor 41 through the second fuel injector 53 (FIG. 10). The fuel heat exchanger 22 and the reformer 23 are heated by heat energy produced by combustion of the raw fuel, and a combustion gas is supplied to the air heat exchanger 31 and the evaporator 21 through the combustion gas passage 42. The air introduced into the cathode gas passage 12 by the air compressor 61 is heated by heat exchange with the combustion gas in the air heat exchanger 31, and the heated air is supplied to the fuel cell stack 1 to heat the fuel cell stack 1. Consequently, the warm-up of the fuel cell stack 1 progresses so that the stack temperature $T_{stk}$ rises (FIG. 13). A cathode off-gas (oxidant gas) discharged from the fuel cell stack 1 is led to the combustor 41 through the cathode off-gas passage 12exh, and remaining oxygen in the cathode off-gas is used as an oxidant for the raw fuel.

When the reformer temperature $T_{ref}$ has reached the reformer lower limit temperature $T_{ref\_min}$ (time t1), the supply of the raw fuel through the first fuel injector 52 is started. In the period PRD2 in which the raw fuel total flow rate $m_{fuel\_ttl}$ according to the stack temperature $T_{stk}$ is greater than a rated flow rate $m_{fuel\_rtd}$ (FIG. 13), the raw fuel of the rated flow rate $m_{fuel\_rtd}$ is supplied to the reformer 23 through the first fuel injector 52, while the raw fuel corresponding to a shortage of the rated flow rate $m_{fuel\_rtd}$ relative to the raw fuel total flow rate $m_{fuel\_ttl}$ (=$m_{fuel\_ttl}$−$m_{fuel\_rtd}$) is supplied to the combustor 41 through the second fuel injector 53.

Then, when the reformer temperature $T_{ref}$ further rises so that the raw fuel total flow rate $m_{fuel\_ttl}$ becomes less than the rated flow rate $m_{fuel\_rtd}$ (time t2), the supply of the raw fuel through the second fuel injector 53 is stopped, and the raw fuel of the raw fuel total flow rate $m_{fuel\_ttl}$ is supplied to the reformer 23 through the first fuel injector 52 (FIG. 13, period PRD3).

Thereafter, when the stack temperature $T_{stk}$ has reached the power generation start temperature T1 (e.g. 500° C.) (time t3), the fuel cell stack 1 is caused to perform power generation, and the raw fuel is supplied through both the first and second fuel injectors 52, 53. Specifically, a switch circuit of a junction box (not illustrated) provided between the fuel cell stack 1 and the power converter 201 (FIG. 2) is closed to start output from the fuel cell stack 1, and the raw fuel of the flow rate (the minimum main fuel flow rate $m_{fuel\_min}$ or the maximum main fuel flow rate $m_{fuel\_max}$) according to the stack inlet-outlet temperature difference $\Delta T_{stk}$ is supplied through the first fuel injector 52, while the raw fuel corresponding to a shortage relative to the raw fuel total flow rate $m_{fuel\_ttl}$ is supplied through the second fuel injector 53. Consequently, while promoting the warm-up by actively utilizing self-heating of the fuel cell stack 1 by power generation, a combustion gas that is produced by the combustor 41 is controlled to its target temperature to provide heat energy necessary for reforming, and further, it is possible to heat the fuel cell stack 1 by heat energy of the combustion gas. Herein, the main fuel flow rate $m_{fuel\_m}$ increases as the stack temperature $T_{stk}$ rises, but is prevented from exceeding the rated flow rate $m_{fuel\_rtd}$ (time t4). That is, during the warm-up, although the raw fuel total flow rate $m_{fuel\_ttl}$ is allowed to increase beyond the rated flow rate $m_{fuel\_rtd}$, the main fuel flow rate $m_{fuel\_m}$ is limited to equal to or less than the rated flow rate $m_{fuel\_rtd}$.

Then, when the stack temperature $T_{stk}$ has reached the warm-up completion determination temperature $T_{wup}$, the start control is ended by determining that the warm-up of the fuel cell stack 1 is completed, thereby shifting to control at the normal time.

(Description of Operations and Effects)

The fuel cell system S according to this embodiment is configured as described above, and the operations and effects obtained by this embodiment will be described below.

First, when starting the fuel cell system S, it is determined whether or not the fuel cell stack 1 is in a state of being capable of power generation, specifically, whether or not the stack temperature $T_{stk}$ has reached the power generation start temperature T1, and when the stack temperature $T_{stk}$ has reached the power generation start temperature T1, the fuel cell stack 1 is caused to perform power generation, and the raw fuel is supplied through both the first and second fuel injectors 52, 53. Consequently, it is possible to utilize heat energy of a combustion gas in addition to the heat generation amount of the fuel cell stack 1 itself by power generation, and therefore, while suppressing an increase in the size of the fuel processing unit (e.g. the reformer 23) and the combustor 41 due to an increase in the fuel flow rate (the raw fuel total flow rate $m_{fuel\_ttl}$) caused by the progress of the warm-up, it is possible to heat the fuel cell stack 1 by large heat energy to realize the quick warm-up.

Second, taking into account the waste heat recovery amount $Q_{rec}$ of an anode gas and the power generation amount $P_{stk}$ of the fuel cell stack 1 in addition to heat energy of a combustion gas for setting the raw fuel total flow rate $m_{fuel\_ttl}$, it is possible to properly set the supply flow rate of the raw fuel (the sub fuel flow rate $m_{fuel\_s}$) for the combustor 41, and therefore, it is possible to prevent the temperature of the combustion gas from rising excessively. Consequently, it is possible to suppress degradation of the combustor 41 and to avoid the application of an excessive heat load to the fuel cell stack 1 due to an increase in the stack inlet-outlet temperature difference $\Delta T_{stk}$.

Third, by setting the target combustor temperature $T_{cmb\_trg}$ based on the stack temperature $T_{stk}$, it is possible to properly set the target combustor temperature $T_{cmb\_trg}$ according to the progress state of the warm-up. Further, it is possible to reduce the computation load of the controller 51 in setting the target combustor temperature $T_{cmb\_trg}$.

Fourth, the ratio of the main fuel flow rate $m_{fuel\_m}$ in the raw fuel total flow rate $m_{fuel\_ttl}$ is switched according to the stack inlet-outlet temperature difference $\Delta T_{stk}$. Specifically, when the stack inlet-outlet temperature difference $\Delta T_{stk}$ is relatively small, the minimum main fuel flow rate $m_{fuel\_min}$ that reduces the ratio is set (S204), and when the stack inlet-outlet temperature difference $\Delta T_{stk}$ is relatively large, the maximum main fuel flow rate $m_{fuel\_max}$ that increases the ratio is set (S205). Consequently, while suppressing an increase in the stack inlet-outlet temperature difference $\Delta T_{stk}$, it is possible to promote waste heat recovery by an anode gas, thereby promoting the warm-up.

Specifically, when the stack inlet-outlet temperature difference $\Delta T_{stk}$ is small, the main fuel flow rate $m_{fuel\_m}$ is set to the minimum value ($m_{fuel\_min}$) so that it is possible to increase the sub fuel flow rate $m_{fuel\_s}$ through a reduction in the waste heat recovery amount $Q_{rec}$ (formula (4.2a)), thereby maintaining a combustion gas at a high temperature. Consequently, it is possible to promote the heating of the fuel cell stack 1 that uses an oxidant gas as a medium, thereby promoting the warm-up. On the other hand, when the stack inlet-outlet temperature difference $\Delta T_{stk}$ is large, the main fuel flow rate $m_{fuel\_m}$ is set to the maximum value ($m_{fuel\_max}$) so that while maintaining the progress of the warm-up by an increase in the waste heat recovery amount $Q_{rec}$, it is possible to suppress the heating of the fuel cell stack 1, which uses an oxidant gas as a medium, by a reduction in the heat energy of a combustion gas, thereby suppressing an increase in the stack inlet-outlet temperature difference $\Delta T_{stk}$.

Fifth, by causing the fuel cell stack 1 to perform power generation at the lower limit voltage $V_{stk\_min}$ according to the stack temperature $T_{stk}$, the heat generation amount $H_{stk}$ by the power generation of the fuel cell stack 1 becomes the maximum so that it is possible to promote the warm-up to shorten the time required for the start.

(Description of Another Embodiment)

Hereinafter, another embodiment of the present invention will be described.

Figure 14:
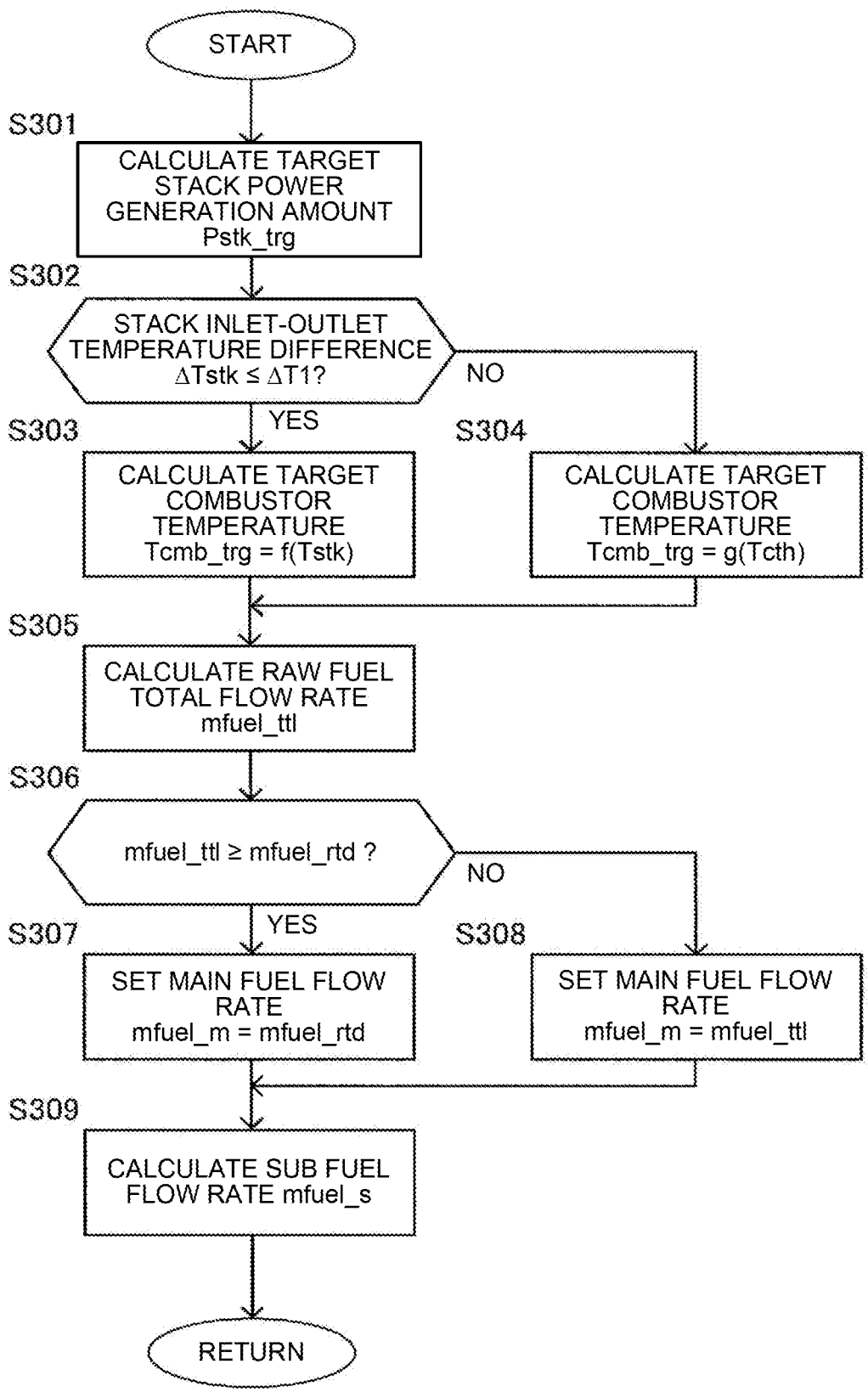
FIG. 14 is a flowchart illustrating the flow of start control of a fuel cell system according to another embodiment of the present invention.

FIG. 14 illustrates the flow of start control (power generation heating mode) of a fuel cell system according to another embodiment of the present invention.

In this embodiment, the configuration of the entire system may be the same as that in the previous embodiment illustrated in FIG. 2. The controller 51 starts the start control in response to an input of a start request signal from the start switch 106 and selects a power generation heating mode or a combustion heating mode according to the same flow as illustrated in FIG. 3.

When the power generation heating mode is selected, the target stack power generation amount $P_{stk\_trg}$ is calculated based on the stack temperature $T_{stk}$ at S301. Specifically, the calculation is performed by the same process as that of S202 of the flowchart illustrated in FIG. 4.

At S302, by the same process as that of S203, it is determined whether or not the stack inlet-outlet temperature difference $\Delta T_{stk}$ is equal to or less than the predetermined value $\Delta T1$. When the stack inlet-outlet temperature difference $\Delta T_{stk}$ is equal to or less than the predetermined value $\Delta T1$, the start control proceeds to S303, and when it is greater than the predetermined value $\Delta T1$, the start control proceeds to S304.

At S303 and S304, the target combustor temperature $T_{cmb\_trg}$ is calculated. For example, at S303, as a temperature for suppressing an excessive temperature rise of the combustor 41, the target combustor temperature $T_{cmb\_trg}$ can be calculated based on an outlet temperature of the fuel cell stack 1 (e.g. the stack temperature $T_{stk}$), and at S304, as a temperature for suppressing an increase in the stack inlet-outlet temperature difference $\Delta T_{stk}$, the target combustor temperature $T_{cmb\_trg}$ can be calculated based on an inlet temperature of the fuel cell stack 1 (e.g. the oxidant gas temperature $T_{cth}$).

Figure 15:
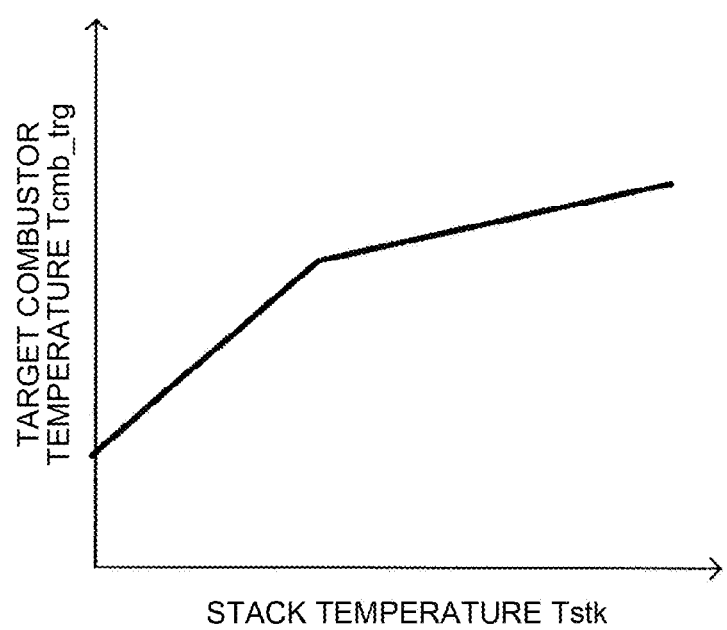
FIG. 15 is an explanatory diagram illustrating the relationship between the temperature of a fuel cell stack and the target combustor temperature.

In this embodiment, at S303, the target combustor temperature $T_{cmb\_trg}$ is calculated, as a temperature according to the stack temperature $T_{stk}$, by retrieval from table data with a trend illustrated in FIG. 15. The target combustor temperature $T_{cmb\_trg}$ is set to a greater value as the stack temperature $T_{stk}$ is higher.

At S304, the target combustor temperature $T_{cmb\_trg}$, set in advance as a temperature that gives the oxidant gas temperature $T_{cth}$, is calculated. It is possible to shorten the computation time by performing retrieval from table data in the same way as at S303.

At S305, the raw fuel total flow rate $m_{fuel\_ttl}$ is calculated. In this embodiment, a difference between the target combustor temperature $T_{cmb\_trg}$ and the combustor temperature $T_{cmb}$ (the temperature detected by the combustor temperature sensor 105) is input into a non-illustrated feedback controller such as a PI controller, and a correction amount that causes the difference to approach zero is added to the raw fuel total flow rate $m_{fuel\_ttl}$.

At S306, it is determined whether or not the raw fuel total flow rate $m_{fuel\_ttl}$ is equal to or greater than the rated flow rate $m_{fuel\_rtd}$. When the raw fuel total flow rate $m_{fuel\_ttl}$ is equal to or greater than the rated flow rate $m_{fuel\_rtd}$, the start control proceeds to S307, and when it is less than the rated flow rate $m_{fuel\_rtd}$, the start control proceeds to S308.

At S307, the main fuel flow rate $m_{fuel\_m}$ is set to the rated flow rate $m_{fuel\_rtd}$.

At S308, the main fuel flow rate $m_{fuel\_m}$ is set to the raw fuel total flow rate $m_{fuel\_ttl}$.

At S309, the sub fuel flow rate $m_{fuel\_s}$ is calculated by subtracting the main fuel flow rate $m_{fuel\_m}$ from the raw fuel total flow rate $m_{fuel\_ttl}$.

According to this embodiment, while simplifying the calculation of the fuel flow rates $m_{fuel\_m}$, $m_{fuel\_s}$, it is possible to contribute to the realization of the quick warm-up.

In the above description, it is configured that, by connecting the combustor 41 to the cathode off-gas passage 12exh of the fuel cell stack 1, an oxidant for catalytic combustion is supplied to the combustor 41 through the cathode off-gas passage 12exh. Consequently, it is not necessary to separately provide a special means for supply an oxidant to the combustor 41 so that it is possible to simplify the configuration of the fuel cell system S. Alternatively, it may be configured that, by connecting the combustor 41 to the cathode gas passage 12, an oxidant is directly supplied to the combustor 41 from the air compressor 61, not through the fuel cell stack 1. Alternatively, a means for supplying an oxidant to the combustor 41 can be provided independently of the cathode gas supply/discharge system.

While the embodiments of the present invention have been described above, the above-described embodiments only show part of application examples of the present invention and are not intended to limit the technical scope of the present invention to the specific configurations of the above-described embodiments. Various modifications and alterations can be made to the above-described embodiments within the scope of the matter recited in the claims.

The invention claimed is:

1. A fuel cell system comprising:
   a fuel cell;
   a fuel processor configured to process a raw fuel to produce a fuel gas for the fuel cell;
   an oxidant gas heater configured to heat an oxidant gas for the fuel cell;
   a combustor configured to combust the raw fuel to produce a combustion gas for use in heating the fuel processor and the oxidant gas heater;
   a first fuel injector configured to supply the raw fuel to the fuel processor and to adjust a flow rate of the raw fuel supplied to the fuel processor;
   a second fuel injector configured to supply the raw fuel to the combustor and to adjust a flow rate of the raw fuel supplied to the combustor; and
   a controller configured to control the first fuel injector and the second fuel injector, and configured to control a power generation state during warm-up of the fuel cell;
   wherein the controller is configured to:
      execute the warm-up of the fuel cell, which comprises, upon the fuel cell reaching a power generation start temperature, controlling the first fuel injector and the second fuel injector so as to cause the fuel cell to perform power generation for heating the fuel cell,
      after the warm-up of the fuel cell, execute rated operation of the fuel cell, which comprises controlling the first fuel injector and the second fuel injector so as to cause the fuel cell to perform power generation for supplying power to an external device,
      wherein (i) a raw fuel total flow rate of the flow rate of the raw fuel supplied from the first fuel injector to the fuel processor and the flow rate of the raw fuel supplied from the second fuel injector to the combustor during the warm-up of the fuel cell, is greater than (ii) the flow rate of the raw fuel supplied from the first fuel injector to the fuel processor during the rated operation of the fuel cell,
      wherein, during the warm-up of the fuel cell, before a temperature of the fuel processor reaches a lower limit temperature, the raw fuel is supplied from the second fuel injector to the combustor without being supplied from the first fuel injector to the fuel processor, and
      wherein, during the warm-up of the fuel cell, after the temperature of the fuel processor reaches the lower limit temperature, the raw fuel is supplied from the first fuel injector to the fuel processor and from the second fuel injector to the combustor.

2. The fuel cell system according to claim 1, wherein the controller is configured to, in response to an increase of a temperature difference between input and output of the fuel cell, increase a fraction of the raw fuel supplied to the fuel processor during the warm-up of the fuel cell.

3. The fuel cell system according to claim 1, wherein the controller is configured to switch between (i) a first supply mode in which a fraction of the raw fuel supplied to the fuel processor is maximized and a fraction of the raw fuel supplied to the combustor is minimized during the warm-up of the fuel cell, and (ii) a second supply mode in which a fraction of the raw fuel supplied to the combustor is maximized and a fraction of the raw fuel supplied to the fuel processor is minimized during the warm-up of the fuel cell; and
   the supply controller is configured to (i) select the second supply mode when a temperature difference between input and output of the fuel cell is equal to or less than a predetermined value, and (ii) select the first supply mode when the temperature difference is greater than the predetermined value.

4. The fuel cell system according to claim 1, wherein a flow rate of the raw fuel that is supplied to the fuel processor during the warm-up is equal to or less than a target flow rate of the raw fuel that is set during the rated operation.

5. The fuel cell system according to claim 1, wherein the controller is configured to cause the fuel cell to perform the power generation at a lower limit voltage according to a temperature of the fuel cell.

\* \* \* \* \*